Figure 1:
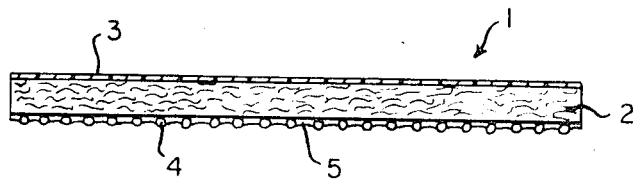

United States Patent

[11] 3,623,659

| [72] | Inventors | Theodore Maierson<br>Dayton;<br>George E. McGowan, Xenia, both of Ohio |
|---|---|---|
| [21] | Appl. No | 888,609 |
| [22] | Filed | Dec. 29, 1969 |
| [45] | Patented | Nov. 30, 1971 |
| [73] | Assignee | The National Cash Register Company<br>Dayton, Ohio |

[54] ARTICLES OF MANUFACTURE CONTAINING ENCAPSULATED, VAPORIZABLE CORE MATERIAL
10 Claims, 4 Drawing Figs.

[52] U.S. Cl.................................................. 239/56,
43/129
[51] Int. Cl......................................................... A61l 9/04
[50] Field of Search............................................ 239/53, 55,
56, 43, 58, 34, 36, 60; 161/DIG. 5, 162, 168, DIG.
1; 43/124, 125, 129, 132; 424/16, 19, 20, 27, 30,
84; 106/15; 252/316; 223/86

[56] References Cited
UNITED STATES PATENTS

| 1,478,208 | 12/1923 | Duddleson et al. | 239/55 |
| 2,238,476 | 4/1941 | Monteith | 239/53 |
| 2,452,957 | 11/1948 | Sabin | 239/56 X |
| 2,980,941 | 4/1961 | Miller | 161/DIG. 5 |
| 3,137,631 | 6/1964 | Soloway | 161/DIG. 1 |
| 3,295,246 | 1/1967 | Landsman et al | 424/27 X |
| 3,306,747 | 2/1967 | Haas | 161/DIG. 5 |
| 3,310,235 | 3/1967 | Zbinden | 239/34 X |
| 3,343,664 | 9/1967 | Poitras | 239/56 X |
| 3,411,976 | 11/1968 | Heliker et al | 161/162 X |
| 3,441,353 | 4/1969 | Claff | 239/34 X |

FOREIGN PATENTS

| 265,546 | 9/1965 | Australia | 239/36 |

Primary Examiner—M. Henson Wood, Jr.
Assistant Examiner—Edwin D. Grant
Attorneys—E. Frank McKinney and Joseph P. Burke ABSTRACT: This disclosure is directed to articles of manufacture, e.g., table cloths, shelf paper, etc., which are disposable paper or other fibrous articles containing as encapsulated core material any liquid or solid whose vapor state is functional in respect of a task to be performed, and on at least one major surface thereof a plastic material having a density ranging from about 0.85 to about 0.95 grams per cubic centimeter and being permeable to vapor but impermeable to liquids. Thus, e.g., upon rupture of capsules containing a liquid insect repellent, the repellent vapor passes through the plastic upper layer, yet the more concentrated repellent liquid is kept from contact with any food or the substances which may be present in contact with the plastic surface layer.

PATENTED NOV 30 1971  3,623,659

INVENTORS
THEODORE MAIERSON &
GEORGE McGOWAN

BY Joseph O'Burke
E. Frank McKinney

THEIR ATTORNEYS

ARTICLES OF MANUFACTURE CONTAINING ENCAPSULATED, VAPORIZABLE CORE MATERIAL

One major object object of the present invention is to provide disposable table cloths and shelf papers having an encapsulated material(s) contained on and/or in the substrate, e.g. one or more fibrous webs constituting a major portion of the table cloth or shelf paper and wherein the capsules are separated from at least one major outer surface of the article by a vapor-permeable, liquid-impermeable plastic layer. This plastic layer is at least substantially continuous throughout its extent, has a density of from about 0.85 to about 0.95 grams per cubic centimeter and is vapor-permeable, viz, permeable to gases, yet liquid-impermeable in thicknesses ranging from about 0.25 to 1 mil (a mil being one-thousandth of an inch). According to a preferred embodiment of this invention, the aforementioned plastic layer having these properties is continuous throughout the entire extent of what is destined to become one major outer surface of the article. According to another embodiment of this invention, reversible, disposable table cloths and shelf papers are provided containing on both the upper and lower major surfaces of the article the aforementioned vapor permeable, liquid impermeable plastic layers.

Prior to the present invention, shelf paper was reported containing an encapsulated insect repellent that was allegedly capable of being slowly released through specially formulated, but compositionally undisclosed capsule walls. See page 45 of the Chemical Week having a listed date of Dec. 21, 1963, under the article entitled "Capsules Capture New Markets." However, there is no reference in the aforementioned publication to the benefits attained by this invention, nor is there any reference to utilization of a vapor-permeable, liquid-impermeable plastic layer(s).

The use of one or more vapor-permeable, liquid-impermeable plastic layer(s) in conjunction with an encapsulated material having functionality in the vapor state enhances the conservation of liquid or solid core material for repeated usage while avoiding contact between the liquid or solid core material and foodstuffs placed on the tablecloth or shelf paper. While contact between foodstuffs and core material in gaseous form can take place, the gaseous core material is in more dilute and widely distributed form (being in admixture with air) than liquid or solid.

The present invention is illustrated in more detail in the drawings.

FIGS. 1 to 4 inclusive are sectional views showing various embodiments of this invention but in greatly increased and exaggerated dimension for purposes of clarity.

FIG. 1 shows a sectional view of a tablecloth 1, or other article demonstrative of this invention, containing paper or other fibrous web 2, having on the bottom surface thereof a layer of capsules 4 associated with a binder 5. On the upper (opposite) major surface of article 1 there is a plastic layer 3 with the vapor-permeable, liquid-impermeable characteristics. Plastic layer 3 can be deposited on woven or nonwoven web 2, e.g., by extrusion, solvent coating or aqueous dispersion coating procedures, prior to deposition of the capsule-binder layer on the opposite surface of web 2. As shown in FIG. 1, the capsules are located predominantly on a major surface of the substrate remote from the plastic layer 3. Alternatively, but less preferably, the capsule-binder layer can be deposited on the upper surface of web 2 prior to deposition of layer 3 thereon, e.g., by aqueous dispersion or solvent coating methods, using a solvent which does not dissolve the capsule wall material selected. Instead of depositing layer 3 by extrusion or coating, a preformed sheet or film can be laminated to a capsule-binder layer deposited on the upper surface of web 2. In such cases, the adhesive can be contained in the binder of the capsule-binder layer, or an extraneous adhesive can be used.

Figure 2:
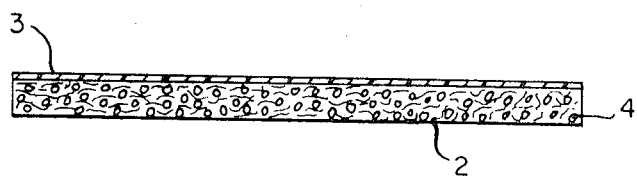

FIG. 2 depicts a sectional view of another embodiment wherein capsules 4 are positionally located largely within fibrous web 2. In such a case it will be noted that no binder or only minor amounts of binder need be employed in conjunction with the distribution of the capsules fairly uniformly within fibrous web 2. Although in FIG. 2 of the drawing, all the capsules are shown to be within the fibrous web, some of the capsules can be located at the upper and/or lower surfaces of web 2 in a position partially or totally outside the fibrous web so that the capsules are both in and on the web. In articles of the type shown in FIG. 2 most of the capsules are contained within the fibrous web. Such articles can be referred to as "-self-contained" articles. They can be prepared to have a high concentration of capsules in the upper portion of the paper web by addition of the capsules in the form of an aqueous or other slurry soon or immediately after formation of the wet fiber mat on the Fourdrinier screen by dribbling (or other systematic addition) of the capsular slurry to the surface of a rotating cylindrical screen ("dandy roll"), whereupon the capsules are redeposited to the wet upper region of the loosely formed continuous fiber mat. Alternatively, the capsules can be added as a slurry to a head box in Fourdrinier paper making machines thereby causing the capsules to be substantially uniformly deposited within the fiber mat as shown in FIG. 2. Articles of the type shown in FIG. 2 can be prepared in accordance with Canadian Pat. No. 757,540, the disclosure of which is incorporated herein by reference.

Figure 3:
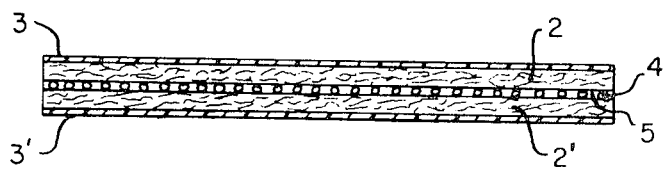

FIG. 3 depicts a reversible article of the type shown in FIG. 1 wherein both the upper and lower major surfaces of 3 and 3' are of vapor-permeable, liquid-impermeable material. In this article, capsules 4 can be located in binder layer 5 intermediate upper and lower paper or other fibrous layers or webs 2 and 2', respectively, which can be of the same or different material. This article can be prepared readily by assembling two plastic coated paper webs with at least one intermediate binder layer containing the aforementioned capsules.

Figure 4:
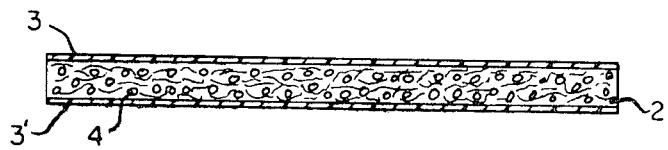

The article shown in FIG. 4 is a reversible one having a "-self-contained" structure substantially the same as that shown in FIG. 2 above but containing an additional plastic layer 3' on the lower major surface thereof so as to permit reversing of the positions of layers 3 and 3' in the upper surface. These articles can be prepared in the same manner as those of FIG. 2 with an additional deposition, e.g., using an extraneous adhesive.

Either or both of substantially continuous layers 3 and 3' (can be provided with a decorative print or other indicia, e.g., utilizing dye(s), pigments, etc. Articles in accordance with either FIGS. 3 or 4 have an added advantage in that they provide protection against contact between the liquid or solid core material contained in the capsules and the underlying surface on which they may be placed. Hence, these articles can be used even on fine polished or lacquered wood furniture since the additional plastic layer (on the fibrous web's lower surface) assist in protecting the wood.

The substrate fibrous web can be any woven or nonwoven fibrous web having a basis weight ranging from about 5 to about 25 pounds per ream, a ream being defined for the purposes herein as an area equal to that of 500 sheets, each being 17 inches by 22 inches, viz., an area of approximately 1,298.6 ft.$^2$, regardless of individual sheet size. A preferred fibrous web material is paper having a basis weight ranging from about 8 to about 15 pounds per ream. In addition to or in place of cellulose fibers of vegetable origin, viz, cotton and wood cellulose (paper), the fibrous web can contain fibers (organic and/or inorganic) both of the synthetic and natural variety. Suitable fibers, which can be present in the fibrous web include, but are not limited to, the following: glass, polyamide (nylon), cellulose acetate, reconstituted cellulose (rayon), polyethylene terephthalate ("Dacron"), linen (flax), polyacrylonitrile ("Orlon"), etc. Combinations of any of the aforementioned fibrous materials can, of course, be employed in woven or nonwoven form.

The capsules 4 are basically generally spherically shaped cells having an internal core of solid or liquid material whose vapor state is functional in respect of a task to be performed, with or without inert extenders or diluents. Suitable solid or liquid core materials include, but are not limited to, the following: insect repellents, such as, paradichlorobenzene, dimethylphthalate, N,N'-diethyl-m-toluamide, ethoxydiethyl benzamide, camphor, etc.; pet repellents; rodent repellents; bactericides (pine oil); perfumes, odorants, reodorants (pine oil), deodorants and other physiologically invigorating fragrances and essences including food aromas. The capsule layer can be continuous or discontinuous, e.g., printed in a pattern or randomly. The capsule "payload," viz, content of core material, can range from about 45 to about 99 wt. percent based on total capsule weight, viz, core material plus cell wall material. Usually core content ranges from 70 to 95 wt. percent. Enclosing the internal core materials are organic, polymeric, pressure-rupturable capsule cell wall materials which are both inert with respect to the core material and capable of retaining it over extended periods of time, which vary depending upon the desired shelf life and longevity of the article in question since usually not all the capsules are broken during each use of the article.

The capsule cell walls can be composed of gelatin-gum arabic preferably hardened with glutaraldehyde. The ratio of hardening agent to gelatin can be varied from 0.01 to 1.0:1 (on a weight basis). Moreover, mixtures of capsules can be used some of which release their contents in a short time period and others which retain their contents for longer terms. Other suitable capsule cell wall materials include, but are not limited to, the following: cellulosic polymers, e.g., ethyl cellulose, nitrocellulose, carboxymethylcellulose; shellac; rosin; vinyl polymers, e.g., poly(vinyl alcohol), poly(vinyl chloride), poly(vinylidene chloride), copolymers of vinylchloride and vinylidene chloride (e.g., "Saran"), mixtures of poly (vinyl chloride) and poly(vinylidene chloride); urea-formaldehyde condensates, melamine-formaldehyde condensates and other aminoplast condensates; polyolefins, e.g., poly(ethylene), poly(propylene), ethylene-propylene copolymers, poly(styrene); polyacrylamides; polyethers; polyesters; polyamides; polyolefins, e.g., polybutadiene, polyisoprene; silicones; epoxy resins; polyurethane; etc.

AS will be observed from the list of suitable exemplary capsule cell wall materials set forth herein, a wide variety of both thermoplastic and thermosettable capsule cell wall materials can be utilized. Moreover, each capsule or some of them can have a plurality of substantially concentric walls, e.g., a primary cell wall of gelatin-gum arabic with a secondary (outer) cell wall of ethylcellulose, nitrocellulose, or equivalent material. Furthermore, all or a portion of the capsules can have a composite cell wall, viz., one in which a plurality of wall-forming components participate in cell wall formation in one manner or another, e.g., the aforementioned capsules having a hydrophilic cell wall of gelatin-gum arabic preferably hardened with an aldehyde, e.g., glutaraldehyde, having hydrophobic inclusions formed of insitu condensates of resorcinol and an aldehyde, e.g., formaldehyde.

In the articles of this invention the capsule contents are usually released by pressure. The individual capsule diameters can range very widely in size. Thus, the capsule size can range from about 2 to about 200 microns, more usually from about 5 to about 100 microns, and preferably from about 10 to about 50 microns. While the size of the individual capsules can vary over a wide range from microscopic size to those large enough to be clearly visible, the predominant concentration of capsules and hence the predominant capsule size (on a particle size distribution weight basis) usually ranges from about 25 to about 100 microns and more usually from about 35 to about 50 microns. These capsules too small to be seen with the unaided eye are known as microcapsules. Individual capsule cell wall thickness can range from about 0.5 to about 20 microns.

A variety of encapsulation procedures can be employed to form the capsules mentioned hereinabove. Thus both mechanical and chemical, e.g., coacervation, encapsulation procedures can be utilized. It should be understood that this invention is not limited by the manner of encapsulating the core material. The specific procedure chosen will depend upon several considerations, including desired capsule size, specific cell wall material used, the specific core material employed, etc. Suitable encapsulation procedures, both chemical and mechanical, can be found in the treatise entitled "Micro Encapsulation" by Anderson et al., published by Management Reports, Boston, Massachusetts (1963). Chapter 2 (pages 9 through 33 and accompanying bibliography) of this report is directed to chemical processes of microencapsulation and chapter 3 thereof (pages 35 through 55 and accompanying bibliography) is directed to mechanical processes of microencapsulation. The disclosure of this publication is incorporated herein by reference.

A typical chemical encapsulation procedure which can be employed to form insect repellent capsules is as follows: a mixture is prepared from approximately 40 grams of the selected liquid core material and approximately 160 grams of an inert diluent oil, e.g., "Magnaflux Oil," which is a commercially available high boiling hydrocarbon solvent having a flash point (minimum) of 140° F., a specific gravity of 0.75 to 0.80, an initial boiling range of 370° to 400° F. and a final boiling range of 450° to 500° F. This material is marketed by Shell Oil Corporation and useful in stabilizing highly volatile core materials and aiding in the encapsulation thereof. 180 milliliters of an 11 weight percent aqueous gelatin sol, 100 milliliters of water and all of the aforementioned core mixture are added to a suitable mixing device, such as a Waring Blendor. The size of the oil droplets are reduced to approximately 25 to 50 microns by sustained agitation. To this mixture there are added 180 milliliters of an 11 percent by weight aqueous gum arabic solution. The resulting mixture is poured into 700 grams of distilled water maintained at 55° C. The resulting mixture after pH adjustment to 4.75±0.05 is allowed to cool to room temperature while stirring. The mixture is then chilled to 10° C. and 10 milliliters of glutaraldehyde are added to effect capsule hardening. The mixture is allowed to stand at this temperature for 24 hours. Then all supernatant is siphoned off and 87 grams of a 25 weight percent aqueous solution of "Essex Gum" (hydroxy ethyl ether derivative of potato starch marketed by the Penick and Ford Corporation) and 22 grams of talc (magnesium aluminum silicate) are added to the coacervate mixture. The consistency of this mixture can be adjusted to accommodate variations in coating technique as desired.

The capsule-containing coating formulation can then be applied directly to the sized or unsized surface of paper or other fibrous webs by use of any known coating techniques, e.g., Meyer rod, spraying, air knife, reverse roll, etc., or it can be printed on the paper surface through the use of silk screen, Gravure or Flexographic printing procedures. When it is desired to prepare an article in accordance with FIG. 1, e.g., Meyer rod coating or Gravure printing procedures can be employed. It is also feasible to spray the capsules as an aqueous slurry containing a flexible binder, viz, one which yields a flexible film upon drying of the coating vehicle. Suitable flexible binders which can be employed in conjunction with such a coating procedure include the water-soluble acrylates and methacrylates, e.g., "SR-2," marketed by Rohm and Haas Company; water-dispersible elastomers, such as butadiene-styrene copolymers, butadiene-acrylonitrile copolymers, etc.

The thickness of the fibrous web(s) on which the capsules are deposited or in which the capsules are contained can range from about 1 to about 10 mils, but usually ranges from about 2 to about 8 mils. The overall thickness of reversible, disposable articles, e.g., such as shown in FIGS. 3 and 4, can range from about 2 to about 15 mils but more usually range from about 3 to about 10 mils.

The organic, polymeric, vapor-permeable, liquid-impermeable plastic layer(s) 3 and 3', are substantially continuous to continuous layers having a substantially uniform thickness ranging from about 0.25 to about 1 mil and more usually from about 0.3 to 0.8 mil, e.g., 0.4 to 0.6 mil. This plastic material has a density ranging from about 0.85 to 0.95 grams per cubic centimeter and more usually ranging from about 0.89 to 0.95 grams per cubic centimeter. A wide variety of polymeric plastic materials can be employed to limit the egress of the capsule core material to that of the vapor form, thereby reducing the concentration thereof due to dilution with other ambient gases present in the atmosphere, e.g., oxygen, nitrogen, etc. Suitable vapor-permeable, liquid-impermeable organic polymeric plastic materials include, but are not limited to, the following polyolefins, e.g., polypropylene, polymers of ethylene, such as polyethylene, copolymers of ethylene and propylene; vinyl resins, e.g., poly(vinyl chloride), poly(vinylidene chloride), copolymers of vinyl chloride and vinylidene chloride, e.g., "Saran," mixtures of poly(vinyl chloride) and poly(vinylidene chloride); polyesters, e.g., poly(ethylene terephthalate) "Mylar"; etc.

The invention will be illustrated in great detail in the following examples which are included for illustrative purposes and should not be construed as limiting the invention.

EXAMPLE 1

This example illustrates preparation of paper articles as shown in FIG. 1 containing pine oil (reodorant and bactericide) as capsule core material.

A paper substrate having a basis weight of 13 pounds/ream (uncoated) and approximately 0.5 mil thick extruded layer of low molecular weight polyethylene (molecular weight of 4,000 to 10,000) on one surface (total thickness of 4 mils) is coated by Meyer Rod on its reverse surface with an aqueous capsule-binder slurry having the below tabulated composition.

| Components | Concentration (Wt. %) |
| --- | --- |
| pine oil capsules (5 to 15 microns) | 30 to 35 |
| "Essex Gum" (binder) | 3 to 4 |
| talc | 3 to 4 |
| water | 60 to 65%. |

The pine oil capsules are prepared as follows: mix 40 grams of pine oil with 160 grams of "Magnaflux Oil." Add 180 ml. of aqueous gel sol (11 wt. percent), 100 ml. of water, and all of the internal phase to a Waring Blendor. Reduce the size of the oil droplets to 5-15 microns. Add to this mixture, 180 ml. of 11 wt. percent aqueous Gum Arabic and adjust pH to 9.0 and add 30 ml. of 2 wt. percent aqueous solution of poly(ethlene maleic anhydride) copolymer (PEMA). Pour into this mix, 700 grams distilled water at 59° C. Add dropwise with stirring 18 ml. of 14 wt. percent acetic acid. Allow to cool to room temperature while stirring. Chill to 10° C. and add 10 ml. of glutaraldehyde. On the following day siphon off all supernatant, add to the coacervate 87 grams of 25 wt. percent aqueous Essex Gum and 22 grams of talc. The consistency of this mixture can be adjusted, of course, to accommodate variations in coating technique.

Upon drying of the capsule coating, by passing through a drying tunnel to remove all excess moisture; the article is placed capsule surface down on a hard wooden surface and pressure is applied to the upper (polyethylene-coated) surface to break a portion of the pine oil capsules. The aroma of pine oil is clearly evident indicating that the pine oil liquid is released from the capsules and passed through the polyethylene layer as a gas.

EXAMPLE 2

The procedure of example 1 is repeated using the same materials except that a liquid volatile insect repellent, N-N'-diethyltoluamide, is employed as capsule core material in place of the pine oil of example 1.

Upon capsule rupture by applying pressure to the top surface of the article, the insect repellent passes in gaseous form through the polyethylene film with no observable migration of liquid to the top of the plastic layer.

EXAMPLE 3

This example illustrates preparation of an article in accordance with FIG. 2 wherein the capsules are distributed fairly uniformly within the fibrous substrate. A laboratory sized Valley hand sheet mold, manufactured by the Valley Iron Works Company, is employed to prepare a paper sheet to serve as the substrate. Approximately 5 grams (dry weight) of a sulfite pulp in aqueous slurry form at 0.5 weight percent consistency is introduced into the sheet mold liquid reservoir. A quantity of an aqueous slurry containing from 20 to 35 weight percent of N,N'-diethyl toluamide capsules, prepared as in example 2, said slurry containing from 1 to 2 grams (dry basis) of said capsules, is comixed with the aforementioned fiber slurry followed by rapid water removal with resultant formation of the wet sheet. The wet pulp sheet is then couched onto a dry blotter surface, lightly pressed while still wet and then dried.

Then the dried sheet is sprayed with a polyvinyl chloride organosol containing toluene as a solvent and dioctyl phthalate as a plasticizer, said organosol having a nonvolatile (resin plus plasticizer) content of 10 to 40 weight percent, to build up an organic polymeric polyvinyl chloride film thickness (dry) of approximately 0.5 mil. Upon drying of the polyvinyl chloride film, pressure was applied from the film surface to the article sufficient to rupture capsules contained therein resulting in release of the characteristic odor of the core material without any noticeable appearance thereof in liquid form on the polyvinyl chloride surface.

EXAMPLE 4

This example illustrates preparation of an article in accordance with FIG. 4. The procedure of example 3 is repeated but subsequent to the drying of the first sprayed polyvinyl chloride organosol film, an additional film thereof is applied also by spraying to the opposite major surface. This film is then dried yielding the structure as shown in FIG. 4. The testing of this article by application of pressure to either film 3, 3' or both surfaces releases the core material in vapor form.

EXAMPLE 5

This example illustrates preparation of an article of the type shown in FIG. 3. In accordance with the procedure described for example 1, a capsule slurry containing the same core material as in example 1 is coated on the paper surface of the polyethylene filmed paper base stock. Prior to drying thereof, a second sheet of the same basis weight paper stock (but with no polyethylene layer) is pressed lightly against the wet slurry coating of the aforementioned sheet to achieve a sandwich construction. This sandwich construction is then dried while sufficient tension is maintained at the edges thereof to insure a substantially wrinkle-free composite.

After drying of the intermediate capsule-containing binder layer, a polyethylene layer (molecular weight 4,000 to 10,000) is applied to the previously uncoated opposite major surface of the composite by conventional hot melt (extrusion) coating at temperatures of 325° to 350° F. This polyethylene layer is then allowed to cool to ambient room temperatures.

The application of pressure to both the upper and lower plastic layers sufficient to cause capsule rupture releases the core material in gaseous form with no noticeable liquid deposit formed on either major plastic coated surface 3 or 3', respectively.

What is claimed is:

1. An article of manufacture comprising at least one fibrous substrate layer containing a plurality of capsules having core material capable of functioning in the vapor state and at least one substantially continuous, vapor-permeable, liquid-impermeable plastic layer on at least one major surface thereof wherein said capsules are located predominantly on a major surface of said substrate remote from said one plastic layer or wherein said capsules are distributed fairly uniformly within said fibrous substrate.

2. An article as in claim 1 wherein said fibrous substrate has a basis weight of from about 5 to about 25 pounds per ream.

3. An article as in claim 2 wherein said fibrous substrate is comprised of paper.

4. An article as in claim 1 wherein said plastic has a density of from about 0.85 to about 0.95 grams per cubic centimeter.

5. An article as in claim 4 wherein said plastic is a polymer of ethylene.

6. An article as in claim 1 wherein said plastic layer has a substantially uniform thickness ranging from about 0.25 to about 1 mil.

7. An article as in claim 1 wherein said capsules range in size from about 2 to about 200 microns.

8. An article as in claim 1 which includes an additional substantially continuous, vapor-permeable, liquid-impermeable plastic layer on a major surface of said substrate remote from said one plastic layer.

9. An article of manufacture comprising two fibrous substrate layers, at least one layer comprising a plurality of capsules having core material capable of functioning in the vapor state positioned intermediate said substrate layers, and each said substrate layer having a substantially continuous, vapor-permeable, liquid-impermeable organic plastic layer on its major outer surface.

10. An article as in claim 9 wherein said capsule layer includes binder.

* * * * *